United States Patent
Erdman

[15] 3,668,489
[45] June 6, 1972

[54] FREQUENCY DOUBLER MOTOR DRIVE AND MOTOR

[72] Inventor: David M. Erdman, Fort Wayne, Ind.
[73] Assignee: General Electric Company
[22] Filed: Apr. 16, 1971
[21] Appl. No.: 134,630

[52] U.S. Cl. .................................318/227, 318/231, 321/66, 328/20
[51] Int. Cl. .......................................................H02p 7/42
[58] Field of Search ................318/227, 231; 321/61, 65, 66, 321/69; 328/20

[56] References Cited

UNITED STATES PATENTS

| | | | |
|---|---|---|---|
| 2,636,155 | 4/1953 | Robinson | 318/231 |
| 2,777,066 | 1/1957 | Brockman | 328/20 X |
| 2,845,588 | 7/1958 | Sampietro | 318/231 |
| 2,867,731 | 1/1959 | Henszey | 321/65 X |
| 3,593,079 | 7/1971 | Plant | 318/227 |
| 3,611,434 | 10/1971 | Jones | 318/227 |

Primary Examiner—Gene Z. Rubinson
Attorney—John M. Stoudt, Radford M. Reams, Ralph E. Krisher, Jr., Joseph B. Forman, Frank L. Neuhauser and Oscar B. Waddell

[57] ABSTRACT

A frequency doubler induction motor drive circuit supplied from a line frequency power source for driving a two-pole induction motor at 7,200 rpm. The drive circuit supplies a 120 Hz waveform to the motor and eliminates the expense of rectifiers and smoothing filters. The crossover points of the 60 Hz waveform are detected, and a gating and timing circuit applies gating pulses to suitably connected silicon controlled rectifiers at the maximum points of the 60 Hz waveform to produce the 120 Hz waveform.

9 Claims, 4 Drawing Figures

INVENTOR:
DAVID M. ERDMAN,
BY Ralph E. Krisher Jr
ATTORNEY

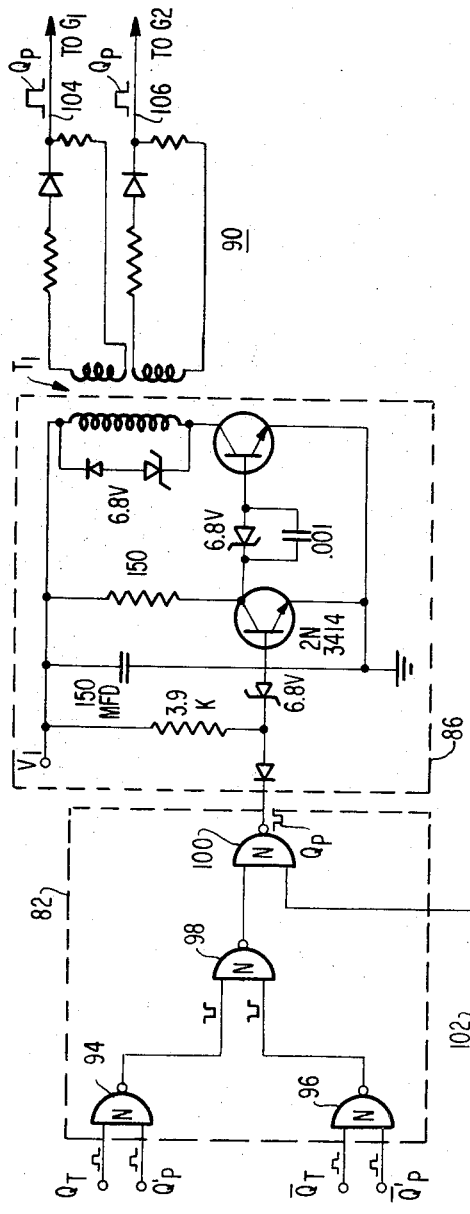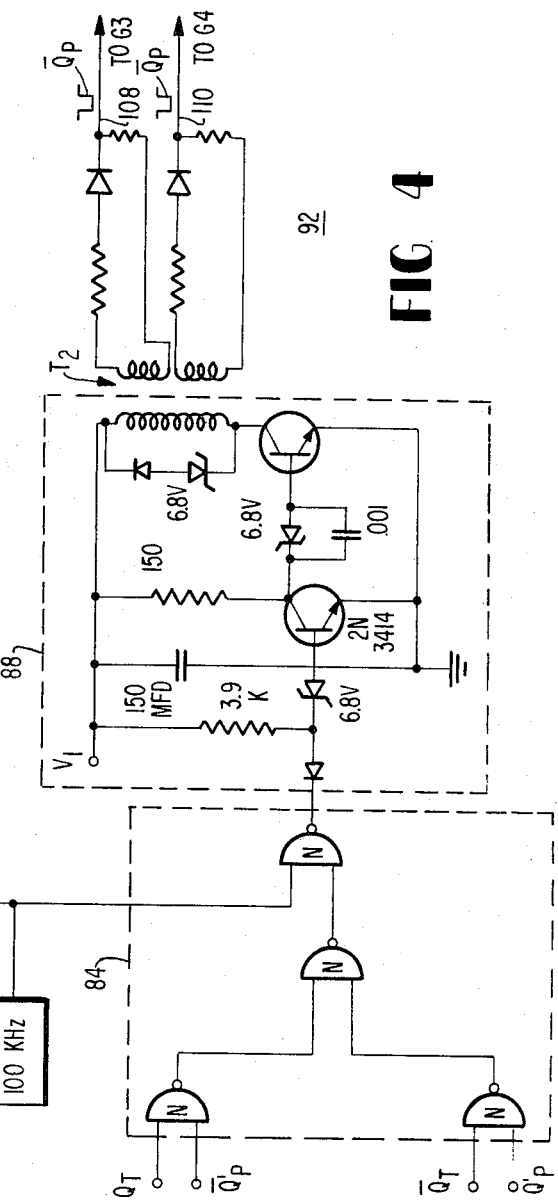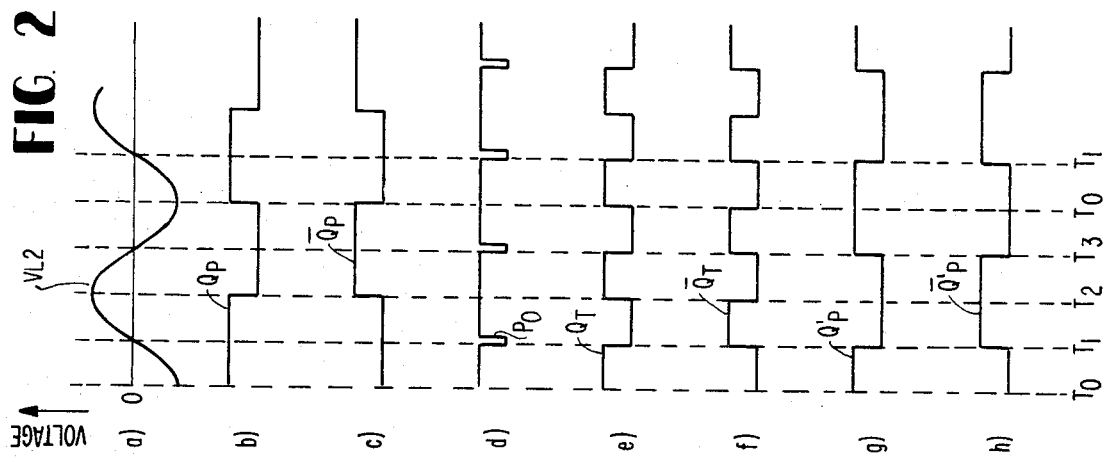
FIG. 4
FIG. 2

FREQUENCY DOUBLER MOTOR DRIVE AND MOTOR

BACKGROUND OF THE INVENTION

1. Field of the Invention

This invention relates generally to the field of frequency doubling drive circuits for motors, and, more particularly to such circuits in combination with such motors.

2. Description of the Prior Art

Frequency doubling drive circuits for induction motors are generally known in the prior art. However, such prior art circuits required expensive rectifiers and smoothing filters. Attempts to reduce the rectifier filter expense in such prior art circuits would increase the power frequency or DC components of the waveform applied to the induction motor. Such lower frequency and DC components are undesirable since an induction motor tends to run at a speed corresponding to the lowest frequency in the motor driving waveform.

SUMMARY OF THE INVENTION

A primary object of this invention is to provide an improved circuit for doubling the frequency of an alternating voltage supplied to a motor wherein the waveform applied to the motor contains substantially no DC component or power line frequency component, even through expensive line rectifiers and filters are not utilized. Another object is to provide an improved motor and drive circuit package wherein the stator windings of the energized motor include two closely coupled windings that form the load of an inverter.

In one form of the invention, suitably connected controlled rectifiers are gated on at selected times by timing and gating circuits to provide a motor driving waveform having a frequency which is twice that of the power line frequency, thereby driving the motor at twice its normal speed. Two closely coupled windings in the output stage of the frequency doubler are magnetically coupled on the magnetic core of the motor and form the excitation windings of the motor.

BRIEF DESCRIPTION OF THE DRAWINGS

FIG. 2 is a timing diagram showing the waveforms of certain signals produced in the operation of the improved frequency doubling drive circuit.

FIG. 4 is a schematic circuit diagram showing one form of a decoder and associated circuits for generating from the control signals gating pulses for switching the controlled rectifiers in the power control circuit of FIG. 1.

DESCRIPTION OF THE PREFERRED EMBODIMENT

Figure 1:
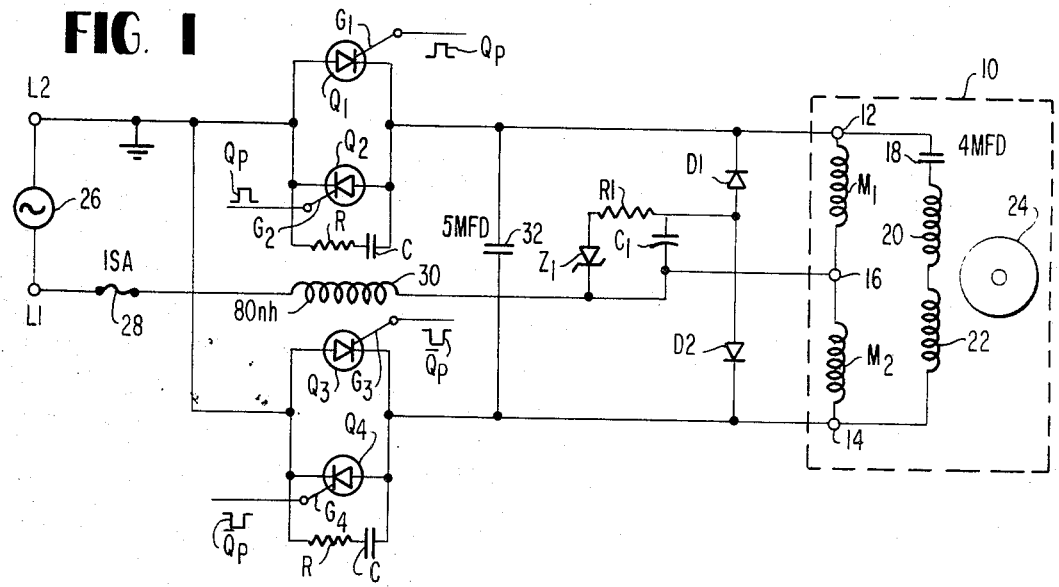
FIG. 1 is a schematic diagram of one form of the power control circuit of the improved frequency doubling drive circuit for an induction motor.

FIG. 1 is a schematic diagram of one form of the power control circuit portion of the improved frequency doubling drive circuit for an induction motor 10.

The motor illustrated in FIG. 1 is a split phase induction motor having a main or running winding which is center tapped. This main winding includes winding sections $M_1$ and $M_2$ which preferably are bifilar wound and connected across motor terminals 12 and 14. The junction of the bifilar winding portions is connected to another motor terminal 16. Also connected across terminals 12 and 14 is a capacitor 18 and auxiliary windings 20 and 22. It will be appreciated that the auxiliary winding circuit could be de-energized after the motor has attained a desired speed. Furthermore, the invention may be embodied in a resistance split-phase motor or in salient pole induction motors. Induction motor 10 also has a rotor 24 which may be either of the squirrelcage type or the wound-rotor type. By "bifilar wound" is meant the arrangement wherein two conductors are wound side by side, with one of the conductors forming part of one winding and the other conductor forming part of another winding, e.g., winding sections $M_1$ and $M_2$ in FIG. 1. By bifilar winding sections $M_1$ and $M_2$, improved magnetic coupling between winding sections $M_1$ and $M_2$ is achieved with the desirable result that voltage transients appearing across $M_1$ and $M_2$, upon switching power between $M_1$ and $M_2$, are less than would otherwise occur.

In the illustrated embodiment of the invention, induction motor 10 is a two-pole motor normally adapted to be driven from a 117 volt, 60 Hz power source 26 at the speed of 3,600 rpm. With the arrangement disclosed herein, however, there is provided an improved frequency doubling circuit for efficiently driving the split phase induction motor 10 at 7,200 rpm. The exemplified circuit accomplishes this objective by converting the 60 Hz supply frequency to a 120 Hz waveform which is free of 60 Hz and DC components. Furthermore, the improved frequency doubling drive circuit described herein provides this conversion without the need for expensive rectifiers and smoothing filters as have been utilized heretofore.

It will be appreciated from the following description that the preferred embodiment includes a frequency doubling drive circuit having an output stage that includes two windings closely coupled on a magnetic core, with the core comprising the magnetic core of a motor and the two closely coupled windings forming the excitation windings of the motor which, when excited, cause rotation of the rotor of the motor.

Power lines $L_1$ and $L_2$ are connected across the 60 Hz power source 26. Connected in series between the power line $L_2$ and the motor terminal 12 is a bilateral switching means illustrated as a pair of parallel-connected oppositely poled controlled rectifiers, such as silicon-controlled rectifiers (SCR) $Q_1$ and $Q_2$. Connected in series between power line $L_2$ and motor terminal 14 is another bilateral switching means exemplified as a pair of parallel-connected oppositely poled controlled rectifiers, such as SCR's $Q_3$ and $Q_4$. Connected across each pair of parallel-connected SCR's is an RC circuit which slightly reduces the rate of rise of voltage across the SCR's.

SCR's $Q_1$ and $Q_3$ are poled in the same direction, and SCR's $Q_2$ and $Q_4$ are poled in the same direction. Power line $L_1$ is connected through a fuse 28 and an 80 microhenry inductor 30 to the motor terminal 16 at the junction of the stator windings $M_1$ and $M_2$.

The SCR's $Q_1$, $Q_2$, $Q_3$ and $Q_4$ are the type which become conducting when a positive potential is applied to their respective gate electrodes $G_1$, $G_2$, $G_3$ and $G_4$ and when their anode-cathode circuits are forward biased. Once an SCR has become conducting, the gate electrode loses control of conduction. Each SCR is turned off or rendered non-conducting by reverse biasing its anode-cathode circuits, so that it does not become conducting again until a positive gating pulse is again applied to its gate electrode.

Also connected across motor terminals 12 and 14 is a five mfd. capacitor 32.

A train of positive gating pulses $Q_P$ is continuously applied to the gate electrodes $G_1$ and $G_2$ of the SCR's $Q_1$ and $Q_2$, respectively. Similarly, a train of positive gating pulses $\overline{Q}_P$ is continuously applied to the gate electrodes $G_3$ and $G_4$ of the SCR's $Q_3$ and $Q_4$, respectively. Each positive pulse of the trains $Q_P$ and $\overline{Q}_P$ has a width equal to one-quarter of the cycle time of the source 26, or in this case, for a 60 cycle source, a width of approximately 8.34 milliseconds. Furthermore, the pulses $Q_P$ and $\overline{Q}_P$ are 180° out of phase with respect to each other. The leading and trailing edge of each of the pulses $Q_P$ and $\overline{Q}_P$ occur at a positive or negative voltage peak of the line voltage $V_L$, and the manner in which the pulses $Q_P$ and $\overline{Q}_P$ are generated will be described in more detail below. It will be appreciated that the waveforms (b) and (c) of FIG. 2 are a simplified representation of $Q_P$ and $\overline{Q}_P$ and that these pulses will be described in more detail hereinafter in connection with the description of NAND gates 98, 100, and amplifier 86.

The operation of the power control circuit illustrated in FIG. 1 will now be described with reference to the timing diagram illustrated in FIG. 2. Waveform (a) illustrates the 60 Hz voltage waveform $V_L$ of the source 26 with a polarity relative to line $L_2$. Waveform (b) illustrates the waveform of the gating pulse train $Q_P$, and waveform (c) illustrates the waveform of gating pulse train $\overline{Q}_P$, it being understood that $Q_P$ and $\overline{Q}_P$ may be described as rectangular waveform envelopes which are comprised of closely spaced high frequency pulses.

The 60 Hz waveform on line $L_2$ is at its maximum negative value at time $T_0$, passes through 0 volts at time $T_1$, and rises to its maximum positive value at time $T_2$. At time $T_3$, the waveform again passes through 0 volts, and falls to the maximum negative polarity at $T_0$ to begin another cycle. The time between adjacent time units $T_0$, $T_1$, $T_2$, $T_3$ and $T_0$ is a one-quarter of a cycle or $\pi/2$ radians.

With the waveforms as illustrated in FIG. 2, the power control circuit illustrated in FIG. 1 operates as follows. At time $T_1$ the positive gate pulse $Q_P$ on the gate electrode $G_1$ of SCR $Q_1$ together with the positive source voltage on line $L_2$ across the anode-cathode circuit of SCR $Q_1$ turns $Q_1$ on, so that during the time interval from $T_1$ to $T_2$ line current flows through $Q_1$ and charges capacitor 32 to a voltage equal to twice the source voltage and also flows downwardly through the stator winding $M_1$ back to line $L_1$. Even though the positive pulse $Q_P$ is also applied to the gate $G_2$ of SCR $Q_2$, since the anode-cathode circuit of SCR $Q_2$ is reverse-biased at this time by the line voltage, SCR $Q_2$ does not conduct during the interval from time $T_1$ to time $T_2$.

At $T_2$ the positive gate pulse $\overline{Q}_P$ is applied to the gate electrodes $G_3$ and $G_4$ of SCR's $Q_3$ and $Q_4$, respectively. Since the anode-cathode circuit of SCR $Q_3$ is also forward-biased at this time by the line voltage, it becomes conducting, and line current passes through it and upwardly through the motor stator winding $M_2$ to $L_1$. Capacitor 32 also discharges at this time in the reverse direction through SCR $Q_1$ and through SCR $Q_3$, thereby turning off or rendering non-conducting the SCR $Q_1$ whose gate electrode $G_1$ is no longer positively biased. Consequently, in one-half cycle of operation, i.e. from time $T_1$ to $T_3$, the flux produced by the currents flowing in opposite directions in the stator windings $M_1$ and $M_2$ in successive quarter cycles has reversed, thereby producing a flux reverse in the motor at a frequency equal to twice the frequency of the source 26, i.e. at 120 Hz.

At time $T_3$, the voltage on line $L_2$ goes negative (and the voltage on line $L_1$ goes positive), thereby reverse-biasing the anode-cathode circuit of SCR $Q_3$ and turning it off, at the same time forward-biasing the anode-cathode circuit of SCR $Q_4$ and turning it on. Line current then flows during the interval $T_3$ to $T_0$ from line $L_1$ downwardly through the motor winding $M_2$ and through SCR $Q_4$ to the line $L_2$.

At time $T_0$ the positive gate pulse $\overline{Q}_P$ is removed from the gate electrodes $G_3$ and $G_4$ of SCR's $Q_3$ and $Q_4$, respectively, and the positive gate pulse $Q_P$ is applied to the gate electrodes $G_1$ and $G_2$ of SCR's $Q_1$ and $Q_2$, respectively. Consequently, the line current flows from $L_1$ upwardly through the stator winding $M_1$ and through SCR $Q_2$ to line $L_2$, while at the same time SCR $Q_4$ is turned off by the discharge of capacitor 32 through SCR $Q_2$ and in the reverse direction through SCR $Q_4$.

At time $T_1$, the cycle repeats and the operation follows the sequence as described above. Consequently, during one cycle of the waveform of the power supply voltage, there are four flux reversals in the motor stator windings $M_1$ and $M_2$, whereby the two-pole induction motor 10 rotates a speed of 7,200 rpm, even through it is supplied from a 60 Hz source 26. Inductor 30 functions as a current limiter to limit the charge on capacitor 32 when line current is switched between the two pairs of parallel-connected SCR's.

The windings $M_1$ and $M_2$ of motor 10 are bifilar windings which are closely magnetically coupled, thereby resulting in autotransformer action. To protect the SCR's $Q_1$, $Q_2$, $Q_3$ and $Q_4$ against high voltage transients which are developed, a protection circuit is connected across the windings $M_1$, $M_2$. More specifically, this protection circuit includes oppositely poled diodes $D_1$ and $D_2$ which are connected across the windings, and a capacitor $C_1$ connected between the junction of the two diodes and the line $L_1$. Connected across the capacitor is a resistor $R_1$ and a zener diode $Z_1$. When the upper end of winding $M_1$ is negative, $C_1$ charges negatively through diode $D_1$, and when the voltage on the upper end of the winding equals or exceeds minus 200 volts, the capacitor discharges through the resistor and zener diode to $L_1$. In like manner, when the upper end of winding $M_1$ exceeds plus 200 volts and by autotransformer action is transferred as a negative 200 volts to the lower end of winding $M_2$, capacitor $C_1$ again charges negatively through the diode $D_2$, and when the capacitor voltage exceeds 200 volts, the capacitor again discharges through the resistor $R_1$ and the zener diode $Z_1$ to line $L_1$, thus limiting the voltage transient seen by the non-conducting SCR's.

Figure 3:
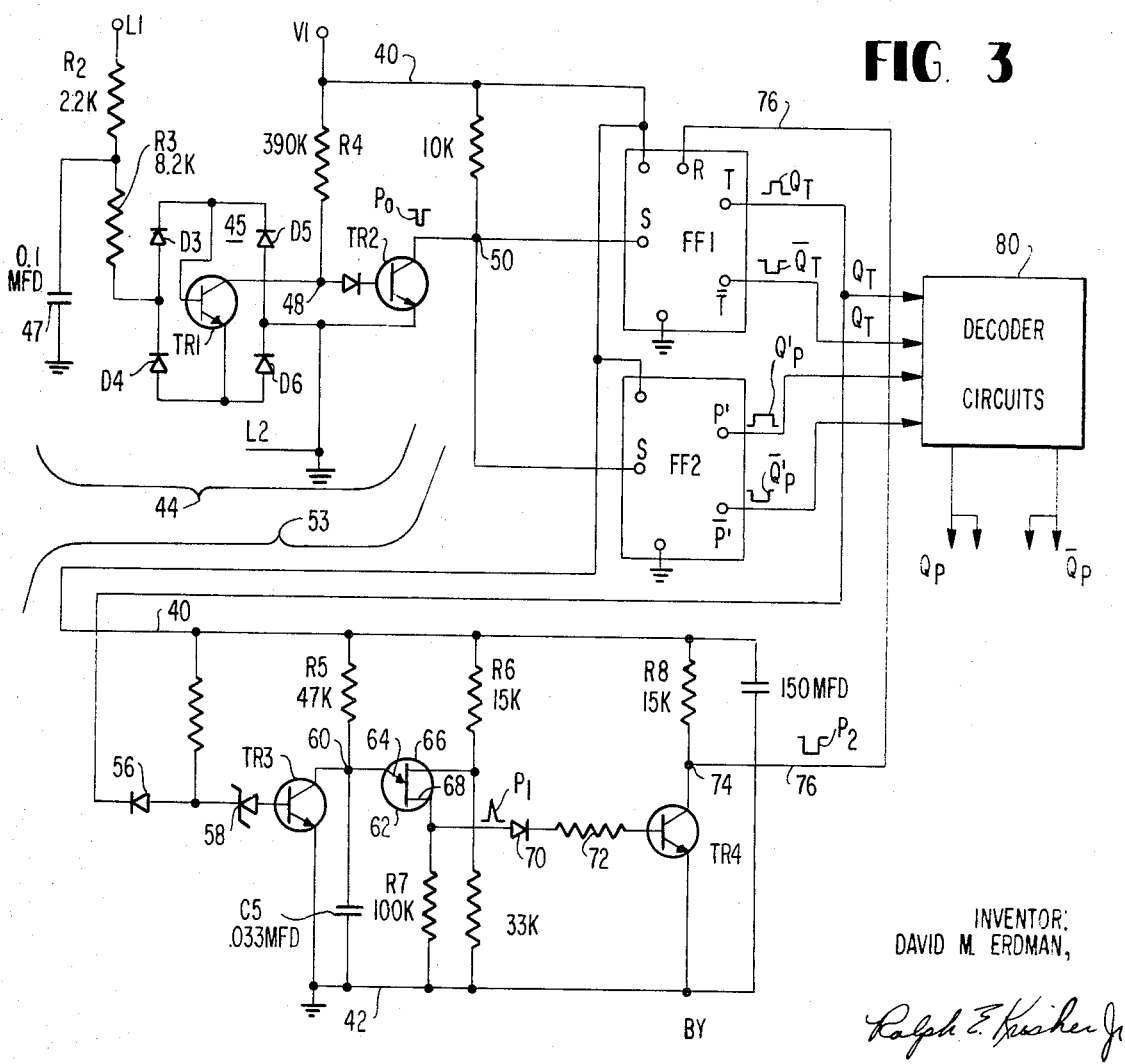
FIG. 3 is a schematic diagram of one form of a zero crossover detector and timing and polarity indicator for generating certain control signals.

FIG. 3 illustrates one form of a circuit for producing the gating pulses $Q_P$ and $\overline{Q}_P$ for switching the SCR's $Q_1$, $Q_2$, $Q_3$ and $Q_4$ at the appropriate positive and negative peak values of the 60 Hz voltage waveform $V_L$ appearing across lines $L_1$ and $L_2$. Since the peak values of the line voltage are relatively difficult to detect, this circuit functions by detecting the zero crossover points of waveform $V_L$ and then inserting a one-quarter cycle delay to provide the gate pulses $Q_P$ and $\overline{Q}_P$ at the peak values of the sinusoidal line voltage.

A suitable d.c. power supply supplies a positive d.c. voltage $V_1$ of approximately +15 volts between conductors 40 and 42, with conductor 42 being tied to the power line $L_2$ as a common ground. Connected across the power lines $L_1$ and $L_2$ is a zero crossover detecting circuit 44, comprising an NPN transistor $TR_1$ connected across a full wave rectifier bridge 45 consisting of diodes $D_3$, $D_4$, $D_5$ and $D_6$. The voltage appearing on line $L_1$ is applied through resistors $R_2$ and $R_3$ to the junction 46 of the bridge. Capacitor 47 shunts noise frequencies of approximately 1,000 Hz and higher to ground.

When $L_1$ is positive, line current flows through diode $D_3$, the base-emitter circuit of transistor $TR_1$ and the diode $D_6$ to line $L_2$, thereby turning on transistor $TR_1$ and permitting direct current to flow from line 42 through resistor $R_4$ and the collector-emitter circuit of transistor $TR_1$ and diode $D_6$ to ground. Similarly, when the voltage of line $L_1$ is negative, line current flows from line $L_2$ through diode $D_5$, the base-emitter circuit $TR_1$ and diode $D_4$ to line $L_1$, also rendering the transistor $TR_1$ conducting so that direct current flows through the base emitter current thereof from line 40.

When transistor $TR_1$ is conducting, the voltage at junction 48 is not sufficiently high enough to turn on the NPN transistor $TR_2$, so that the voltage at junction 50 is relatively high when transistor $TR_1$ is conducting. However, when the line voltage $V_L$ appearing across lines $L_1$ and $L_2$ passes through 0 volts, the transistor $TR_1$ turns off or becomes relatively non-conducting, so that the voltage at junction 48 rises quickly toward the positive voltage $V_1$, thereby turning on transistor $TR_2$ and causing the junction 50 to fall to a relatively low value and form the trigger pulse $P_0$ which is applied to a timer and polarity indicator circuit 53. Consequently, such a trigger pulse $P_0$ is formed at every zero crossover point of the line voltage waveform $V_L$ appearing across lines $L_1$ and $L_2$ with the negative transitions of the pulses corresponding in time to the zero crossover points.

The trigger pulse $P_0$ is supplied in common to the set terminal S of each of a pair of flip-flops $FF_1$ and $FF_2$. Each of these flip-flops is set by the negative transition of a trigger pulse $P_0$. $FF_2$ follows the trigger pulses $P_0$ and provides complementary 60 Hz square wave control pulses $\overline{Q}_P$ and $Q_P$ on the complementary output terminals $\overline{P}$ and $P$, respectively.

Flip-flop $FF_1$ is also set or triggered by the negative transitions of the trigger pulses $P_0$. Normally, the voltage levels of the complementary outputs T and $\overline{T}$ of $FF_1$ are such that the T output is high and the $\overline{T}$ output is low. However, when the negative transition of the trigger pulse $P_0$ occurs, these voltage levels reverse, and, for example, the T output falls to produce a negative transition of the pulse train $Q_T$. This negative transition passes through a diode 56 and a zener diode 58 to the base electrode of a normally conducting NPN transistor $TR_3$.

The collector of transistor $TR_3$ is connected to the junction 60 of a resistor $R_5$ and a capacitor $C_5$ which form a timing circuit with a unijunction transistor 62. The emitter 64 of the unijunction 62 is connected to junction 60, the upper base 66 is connected through a resistor $R_6$ to $V_1$ and the lower base 68 is connected through a resistor $R_7$ to ground. The transistor $TR_3$ is normally conducting and shunts current from the conductor 40 and resistor $R_6$ around capacitor $C_5$ to ground, thereby preventing the capacitor from charging. The unijunction transistor 62 is normally non-conducting. However, when the negative transition of a pulse $Q_T$ appears on the output of flip-flop $FF_2$, the resulting negative pulse turns off transistor $TR_3$, and thereby permits capacitor $C_5$ to charge through resistor $R_5$ to the firing voltage of the unijunction transistor 62. The values of $R_5$ and $C_5$ are chosen such that the $R_5 C_5$ time constant permits this firing voltage to be reached in exactly the time corresponding to one-quarter cycle of the 60 Hz line voltage. When this firing voltage is reached, the unijunction transistor 62 becomes suddenly conducting and capacitor $C_5$ discharges through the emitter 64 and lower base 68 of the unijunction transistor to develop a sharp positive voltage peak $P_1$ across the lower base resistor $R_7$. The unijunction transistor 62 resets itself to a non-conducting condition as soon as the capacitor voltage falls to a predetermined minimum value. The positive pulse $P_1$ is applied through a diode 70 and a resistor 72 to the base electrode of a transistor $TR_4$, thereby turning on the transistor to develop a negative pulse $P_2$ at the junction 74 of the collector electrode and the collector resistor $R_8$. This negative pulse is fed back via a conductor 76 to the reset terminal R of the flip-flop $FF_1$, thereby causing the T output of the flip-flop to return to its positive level. Because of this feedback action of the timing circuit, the waveforms $Q_T$ and $\overline{Q}_T$ are both 120 Hz, rather than 60 Hz, square waves. The waveforms $P_0$, $Q_T$, $\overline{Q}_T$, $Q'_P$ and $\overline{Q}_P$ are illustrated in FIG. 2 on lines (d), (e), (f), (g) and (h), respectively.

The output signals $\overline{Q}'_p$, $Q'_p$, $\overline{Q}_T$ and $Q_T$ from the flip-flops $FF_1$ and $FF_2$ are applied to a decoder circuit 80 to produce the gating pulses $Q_P$ and $\overline{Q}_P$ for firing the SCR's $Q_1$, $Q_2$, $Q_3$ and $Q_4$ at the peak positive and negative polarities of the line voltage $V_L$ as previously described. The details of one form of a decoder circuit for producing these gating pulses are shown in FIG. 4.

The decoder circuit 80 illustrated in FIG. 4 comprises two identical decoders 82 and 84, two identical amplifiers 86 and 88, and two identical output circuits 90 and 92.

In view of the identity of the circuits for producing the two sets of gating pulses $Q_p$ and $\overline{Q}_p$, the circuit operation for producing only the gating pulses $Q_p$ will be described in detail, and reference will be made to the timing diagrams illustrated in FIG. 2.

Decoder 82 comprises 4 NAND gates 94, 96, 98 and 100. The signals $Q_T$ and $Q'_p$ are applied to the two inputs of the NAND gate 94 whose output is applied to one input of the NAND gate 98. Similarly, signals $\overline{Q}_T$ and $\overline{Q}'_p$ are applied to the two inputs of the NAND gate 96 whose output is connected to the other input of the NAND gate 98. The output of NAND gate 98 is applied to one input of the NAND gate 100, and the output of a 100 KHz oscillator 102 is applied to the other input of the NAND gate 100 whose output is applied to the amplifier 86.

A NAND gate is a well known logic circuit which produces a negative pulse on its output only when both of its inputs are positive. For any other combination of inputs, the output of the gate can be considered either positive or zero.

Consequently, when all the inputs to NAND gates 94 and 96 are positive, the output of the NAND gate 98 is the positive envelope of waveform $Q_p$. The envelope of waveform $Q_p$ is modulated with 100 KHz pulses in the NAND gate 100 and the output of NAND gate 100, pulse train $\overline{Q}_p$ is amplified by amplifier 86 which also effects an 180° phase reversal of $\overline{Q}_p$ and coupled to the output circuits 80 by a pulse transformer $T_1$ to provide the positive gating pulse train $Q_p$ on the output leads 104 and 106 which are connected to the SCR gating electrodes $M_1$ and $G_2$, respectively. It can be seen that the logic operations performed by decoder 82 and the associated circuit (e.g. amplifier 86) produce the waveform $Q_p$. As shown in FIG. 2(b), this waveform changes voltage levels at the peak negative and positive polarities of the line voltage waveform $V_{L2}$.

Similarly, the decoder 84, amplifier 88, transformer $T_2$, and output circuit 92 operate upon a different combination of the signals $Q_T$, $\overline{Q}_T$, $Q'_p$ and $\overline{Q}'_p$ to produce on the output leads 108 and 110 the gating pulse waveform $\overline{Q}_p$ which is applied to the SCR gate electrodes $G_3$ and $G_4$. Again, it can be seen that the logical operations produce the waveform $\overline{Q}_p$ as illustrated in FIG. 2(c) when all the inputs to the decoder 84 are positive. This waveform is complementary to the waveform $Q_p$ and which also switches at the peak negative and positive polarities of the line voltage waveform $V_{L2}$.

There has been described above one form of my frequency doubler motor drive. In this form, the illustrated two-pole split-phase induction motor 10 is driven from a 60 Hz source at 7,200 rpm using an SCR inverter with no filtering of the power to the motor windings. Furthermore, the SCR's are switched at the proper time to create a 120 Hz waveform with no d.c. or 60 Hz component. The absence of rectification and filtering of the line power applied to the motor reduces the size and cost of the hardware required as compared to the prior art. Further reduction in size can be realized by integrating the control circuits. The drive may also be used with an induction motor having a single-ended stator winding, in which case the 120 Hz power is coupled to the stator windings via a transformer having a center-tapped primary winding which then forms part of the output stage of the frequency multiplying drive circuit. It will also be appreciated that the drive circuit may be mounted in any suitable manner to the motor driven thereby to form a dynamoelectric machine package.

While in accordance with the Patent Statutes, I have more particularly described what at present is considered to be the preferred embodiment of my invention, it will be obvious to those skilled in the art that numerous changes and modifications may be made therein without departing from the invention, and it is therefore intended in the appended claims to cover all such equivalent variations as fall within the true spirit and scope of the invention.

I claim:

1. A frequency doubler induction motor drive for supplying drive power to a single phase induction motor at a frequency which is twice that of a single phase a.c. power source, and having first and second line terminals; the motor having first, second and third motor terminals, a first stator winding connected between the first and second motor terminals, and a second stator winding connected between the second and third motor terminals, said drive comprising: means for connecting said first line terminal to the second motor terminal; a first switching circuit comprising first and second oppositely poled, parallel-connected controlled rectifiers; means for connecting said first switching circuit between said second line terminal and the first motor terminal; a second switching comprising third and fourth oppositely poled, parallel-connected controlled rectifiers; means for connecting said second switching circuit between said second line terminal and the third motor terminal; a commutating capacitor connected between the first and third motor terminals; and logic means for generating gating pulses for rendering each controlled rectifier conducting only during a different quarter cycle of each cycle of the a.c. power source so that four flux reversals occur in the first and second stator windings during each cycle of said a.c. power source, whereby the induction motor is supplied with drive power having a frequency which is twice that of the a.c. power source.

2. A frequency doubler induction motor drive as defined in claim 1 wherein said controlled rectifiers comprise silicon controlled rectifiers each having a gate electrode; and wherein said logic means comprises: means for generating complementary first and second trains of said gating pulses, each of said gating pulses having a pulse width equal to one-half cycle of the a.c. power source and beginning and ending at a peak voltage of the a.c power source; means for applying said first train of gating pulses to the gate electrodes of said first and second controlled rectifiers; and means for applying said second train of gating pulses to the gate electrodes of said third and fourth controlled rectifiers.

3. A frequency doubler induction motor drive as defined in claim 2 wherein said logic means further comprises: means for generating a train of control pulses corresponding to each occurrence of zero voltage of the a.c. power source; means responsive to said control pulses for generating a first train of logic pulses each having a pulse width equal to one-half cycle of the a.c. power source and beginning and ending at the zero voltage times of the a.c. power source; means responsive to said control pulses and including delay means for generating a second train of logic pulses each having a pulse width equal to one quarter cycle of the a.c. power source; and logic gates responsive to said first and second trains of logic pulses for producing said complementary first and second trains of said gating pulses.

4. A frequency doubler motor drive for supplying drive power to a motor stator at a frequency which is twice that of an a.c. power source and having first and second line terminals; first, second and third motor terminals; a first stator winding connected between said first and second motor terminals; and a second stator winding connected between said second and third motor terminals, said drive also having: means for connecting said first line terminal to said second motor terminal; a first switching circuit comprising bilateral switching means; means for connecting said first switching circuit between said second line terminal and said first motor terminal; a second switching circuit comprising bilateral switching means; means for connecting said second switching circuit between said second line terminal and said third motor terminal; and logic means for generating gating pulses for rendering the bilateral switching means conducting only during preselected portions of each cycle of applied a.c. power so that flux reversals occur in the first and second stator winding during each cycle of applied a.c. power; whereby a.c. power impressed upon the bilateral switching means may be supplied to the motor as drive power having a frequency which is twice that of the a.c. power source.

5. A frequency doubler motor drive as defined in claim 4 wherein said bilateral switching means comprise solid state devices each having a gate electrode, and wherein said logic means comprises: means for generating complementary first and second trains of said gating pulses, each of said gating pulses having a pulse substantially equal in width to one-half cycle of the a.c. power source and beginning and ending at a peak voltage of said a.c. power source; and means for applying said first and second trains of gating pulses respectively to the gate electrodes of said first and second bilateral switching means respectively.

6. A frequency doubler motor drive as defined in claim 5 wherein said logic means further comprises: means for generating a train of control pulses corresponding to each occurrence of zero voltage of the a.c. power source; means responsive to said control pulses for generating a first train of logic pulses each having a pulse substantially equal in width to one-half cycle of the a.c. power source and beginning and ending at the zero voltage times of the a.c. power source; means responsive to said control pulses and including delay means for generating a second train of logic pulses each having a pulse substantially equal in width to one quarter cycle of the a.c. power source; and logic gates responsive to said first and second trains of logic pulses for producing said complementary first and second trains of said gating pulses.

7. A dynamoelectric machine package comprising: a frequency doubler motor drive having input termination means for connection with a source of a.c. power, an output stage, and output termination means connected to the output stage; the output stage comprising a pair of closely coupled windings; and a dynamoelectric machine magnetic core; said motor drive comprising first bilateral switching means connected between an input termination means and an output termination means, and second bilateral switching means connected between another input termination means and another output termination means; and logic means for generating gating pulses for rendering the bilateral switching means conducting only during preselected portions of each cycle of applied a.c. power so that flux reversals may occur in the pair of closely coupled windings during each cycle of a.c. power applied to the bilateral switching means thereby to provide drive power having a frequency which is twice that of the a.c. power source for utilization in maintaining a desired cyclically varying magnetic flux distribution in the dynamoelectric machine magnetic core.

8. The structure of claim 7 wherein the output stage closely coupled windings are wound on the dynamoelectric machine core and closely coupled thereon, whereby flux reversals occurring in the pair of closely coupled windings maintain the desired cyclically varying magnetic flux distribution in the dynamoelectric machine magnetic core.

9. The structure of claim 8 wherein at least one motor winding is accommodated on the dynamolelectric machine core and the closely coupled windings are connected in parallel circuit relation with the at least one motor winding.

* * * * *